June 4, 1968

A. R. PITKANEN 3,386,478

TAGGING AND TYING APPARATUS

Filed April 25, 1966

INVENTOR.
ALAN R. PITKANEN

BY Christie, Parker & Hale
ATTORNEYS

June 4, 1968  A. R. PITKANEN  3,386,478
TAGGING AND TYING APPARATUS
Filed April 25, 1966  10 Sheets-Sheet 3

INVENTOR.
ALAN R. PITKANEN
BY
Christie, Parker & Hale
ATTORNEYS

June 4, 1968  A. R. PITKANEN  3,386,478
TAGGING AND TYING APPARATUS
Filed April 25, 1966  10 Sheets-Sheet 4

INVENTOR.
ALAN R. PITKANEN
BY
*Christie, Parker & Hale*
ATTORNEYS

FIG_6

June 4, 1968 A. R. PITKANEN 3,386,478
TAGGING AND TYING APPARATUS
Filed April 25, 1966 10 Sheets-Sheet 7

FIG_10_

FIG_11_

INVENTOR.
ALAN R. PITKANEN
BY
Christie, Parker & Hale
ATTORNEYS

June 4, 1968  A. R. PITKANEN  3,386,478
TAGGING AND TYING APPARATUS

Filed April 25, 1966  10 Sheets-Sheet 8

INVENTOR.
ALAN R. PITKANEN
BY
Christie, Parker & Hale
ATTORNEYS

June 4, 1968   A. R. PITKANEN   3,386,478
TAGGING AND TYING APPARATUS
Filed April 25, 1966   10 Sheets-Sheet 9

FIG. 13.

INVENTOR.
ALAN R. PITKANEN
BY
Christie, Parker & Hale
ATTORNEYS.

United States Patent Office 3,386,478
Patented June 4, 1968

3,386,478
TAGGING AND TYING APPARATUS
Alan R. Pitkanen, Los Angeles, Calif., assignor to Royal Industries, Inc., Pasadena, Calif., a corporation of California
Filed Apr. 25, 1966, Ser. No. 544,925
15 Claims. (Cl. 140—93.6)

This invention relates to apparatus for automatically tagging and typing articles with tie material capable of being twisted to form a tie.

The present invention is an improvement over the tying apparatus described in the copending application bearing Ser. No. 427,546 entitled, "Tying Apparatus," and assigned to the same assignee as the present invention. The invention in this copending patent application, in addition to the present invention, is implemented by means of the basic tying machine described and claimed in copending application bearing Ser. No. 406,960 and also assigned to the same assignee as the present invention.

The aforementioned copending applications are typical of the tying machines that are presently commercially available for closing bags and the like by means of tie material or tie strips capable of being tied by twisting. It should be appreciated that heretofore no known tying machine incorporates automatic means for feeding tags to the machine for simultaneously tying and tagging an article. The only presently known tying machine that affords any capability of tagging an article as well as tying is the tagging and tying machine disclosed and claimed in the aforementioned copending application bearing Ser. No. 427,546. This tying machine however affords only manual insertion of the tags into the machine and accordingly the operator must provide an individual tag for each article desired to be tied and tagged as well as operating the machine proper. The present invention frees the operator from handling the tags in that it incorporates means for automatically feeding the tag into the tying machine proper to allow the article to be tagged to be simultaneously tagged and tied without any manual operations. The freeing of the operator to handle the article to be tied or the bags to be tied and the like speeds up the overall tying operation with a minimum of additional expenditure for the tying machines proper.

The present invention broadly comprehends means for automatically twisting and tying a preselected length of tie material around an article to be tied and means for automatically positioning a tag adjacent the twisting and tying means to be carried by the tie material and simultaneously tied to the article. The coaction of these means is controlled through the provision of means coupled to the automatic tag positioning means to be responsive to a completed tagging and tying operation for actuating the automatic tag feeding means for positioning another tag to be tied for a subsequent operation. When the tags are delivered to the tying machine in the form of a string of tags the automatic tag feeding means may include means for severing a tag from the string of tags during the feeding of the tags to the machine to allow the tag to be withdrawn from the machine along with the tied article.

Other features and advantages of this invention will become apparent from the following detailed description and the accompanying drawings, in which:

FIG. 5 is a front elevational view of the tagging and tying apparatus;

FIG. 14 is a side elevational view, shown partly in cross-section, with the section taken along the line 14—14 of FIG. 13.

Now referring to the drawings, the present invention will be seen to comprise a basic tying machine A mounted to a base member B also mounting a tag supply reel C. The basic tying machine A mounts the mechanism D for automatically positioning tags E received from the tag supply reel C, as a continuous string of tags, into the tying machine to allow an article to be simultaneously tied and tagged. The automatic tag feed mechanism D includes means for severing a tag E from a string of tags thereby allowing the tied and tagged article to be withdrawn from the tying machine A.

The basic tying machine A will first be considered.

The tying machine A for the purposes of the present invention can be best described in terms of the tying machine described in a copending patent application bearing Ser. No. 406,960 which discloses the tying apparatus for the purposes of the present invention without the facility for automatically tagging an article. Accordingly the disclosure of this latter mentioned copending application is incorporated herein by reference. The tying machine A described immediately hereinafter is presented for the purpose of facilitating the understanding of the present invention and a more detailed description of this tying machine may be had, if required, by reference to the latter mentioned copending patent application.

Figure 13:
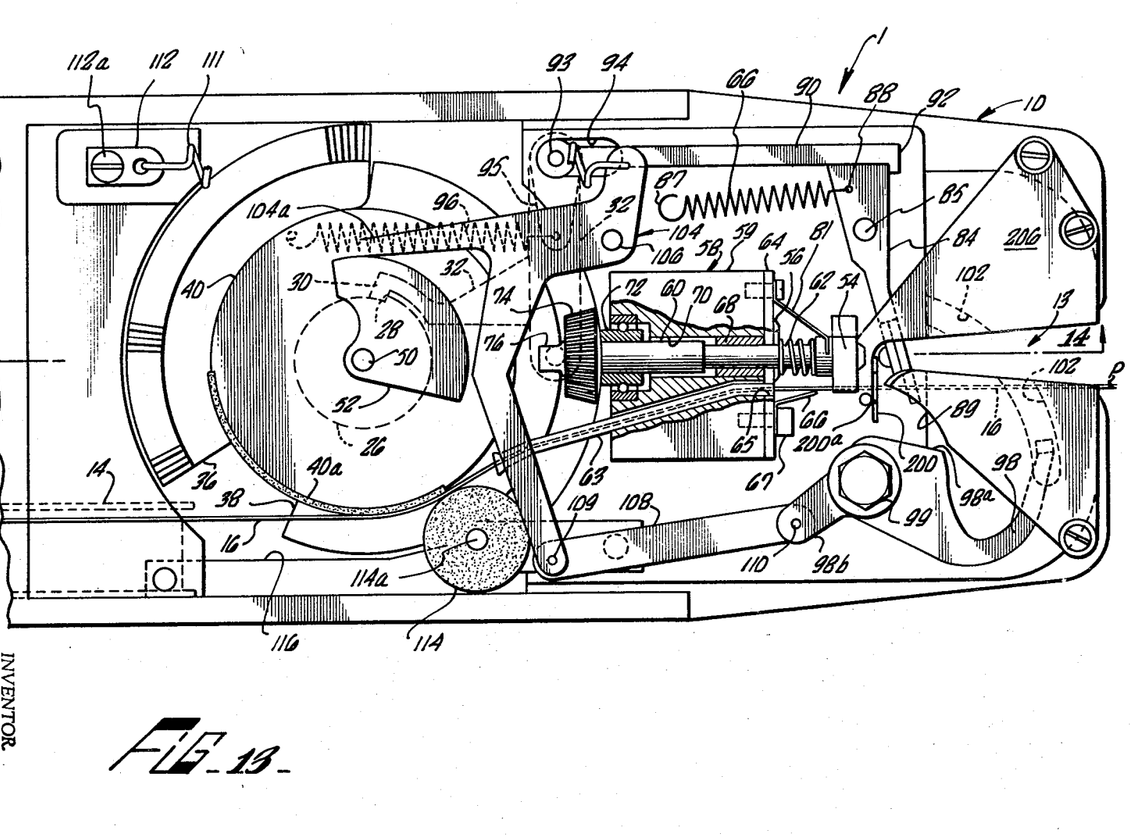
FIG. 13 is a top view of the tagging and tying machine, with the cover removed, and shown in its normal inoperative relationship.
Figure 15:
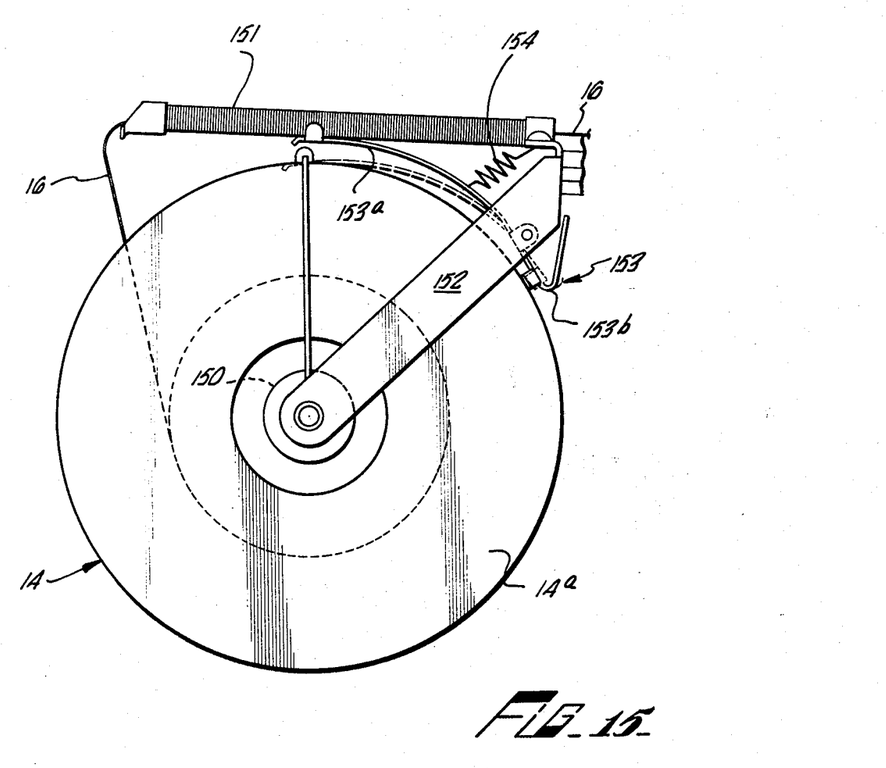
FIG. 15 is an elevational view of the tie material reel brake.

Referring to FIGS. 13 through 15 the tying apparatus A will be seen to comprise a frame 10 having a removable cover 12 thereon. A V-shaped groove or throat 13 is formed in the frame 10 having converging walls for purposes of gathering the sides of the bag to be tied.

A spool 14 mounted upon a shaft (not shown) which is fixedly attached to the frame 10 contains tie material 16 in a coil form and the material may be of any suitable variety and includes such things as soft iron wire, but more preferably includes paper or plastic covered soft wire as mentioned hereinabove.

For purposes of actuating the tying mechanism, there is provided a conventional electric motor 18 with a shaft 20 which is engaged with a gear box 22 for purposes of reducing the speed of the motor output shaft 20. A shaft 24 extends outwardly from gear box 22 and has mounted thereon a conventional one way clutch 26 having formed thereon a stop 28 which is engageable with a dog 30 formed on movable arm 32. Clutch 26 is of a conventional design and one acceptable construction is illustrated in detail on page 82 of Ingenious Mechanisms for Designers and Inventors, vol. 2, edited by Franklin D. Jones, The Industrial Press, 1936, New York, N.Y. This clutch is used for transforming continuous rotary motion into intermittent rotary motion allowing a single rotation of shaft 34 after the dog 30 engages stop 28. In this manner, motor 18 may be continuously rotated and as desired, the clutch 26 may be engaged by arm 32 to activate the tying mechanism. A number of other suitable clutches for performing the same function are available on the market today.

A program plate 35 which comprises a segmented bevel gear 36, a flat segmented plate 38, and a friction feeding disc 40 all which are attached to each other by a pair of flat head machine screws 42. A hub 44 integrally formed on the feeding device 40 extends downwardly through the segmented plate 38 and segmented bevel gear 36 and is pressed upon the output shaft 34 extending from clutch 26. A ball bearing 46 is pressed around the periphery of the hub 44 and a ball bearing 48 is pressed upon post 50 and the cover 12 thereby providing stability and allows rotation of the program plate 35. A cam 52 rests upon the upper portion of feeding disc 40 and is pressed upon the post 50. It is noted that the gear 36, plate 38, feeding disc 40, and cam 52 are all positioned with a different angular relation to each other and the particular purpose of this interrelation will become apparent in the discussion of the operation of the present invention.

A means for severing and twisting a tie includes a twister head 54, a shear blade 56, and a shear block 58. Twister head 54 is locked upon the shaft 60 along with shear blade 56 by a pair of flats 60A and 60B formed on opposite sides of shaft 60. Spring 62 constantly urges shear blade 56 against the shear plate 64 thereby insuring shearing action. A metal tubing 63 is mounted in a passageway of shear block 58 which directs the tie 16 therein projecting it toward twister head 54. Guide 66 is mounted upon the block 58 by screw 67 passing therethrough and retaining both guide 66 and the shear blade 64 to the block 58. Guide 66 prevents the tie material 16 from being diverted laterally with relation to the twister head 54 where it is being fed outwardly toward the right hand portion of the bag tying apparatus 1. A shaft 60 is supported on one end by a journal bearing 68 received within the main passageway 70 and ball bearing 72 mounted at its opposite end. The shaft 60 terminates in a bevel pinion gear 74 which is engageable with the segmented bevel gear 36. Shaft 60 has an extension 76 extending axially from gear 74, with a step 78 which is formed on portion 74 for engagement with segmented plate 38 (see FIG. 14) for purposes of preventing rotation of twister head 54 and shear blade 56 during a certain portion of the rotation of the program plate 35. The opening 65 in shear blade 64 is shaped such that the tie 16 is wedged therein as shear blade 56 is rotated by shaft 60 until the cutting edge 57 severs tie 16.

The twister head 54 has a profile having a generally Z-shaped configuration. A pair of arcuately shaped arms of fingers 54A and 54B and a pair of arcuately shaped slots 55A and 55B. A pair of flats, similar to the flat identified by the reference numeral 81, are formed on opposite sides of twister head 54 and are substantially parallel to each other. The proximate relation of the opening at 65 in shear blade 64 directs the tie material 16 adjacent to the flat 81 thereby allowing the tie 16 to be in alignment with slot 55B upon rotation of twister head 54. Similar action occurs on the opposite side of twister head 54 upon the doubling over of the tie material 16.

Guide 81 is fixedly mounted to block 59 and has an extremity formed in the shape of a foot 82, which is positioned parallel to the rotation of twister head 54, tends to urge the tie material 16 into engagement with twister head 54, and aids in more tightly twisting tie 16 upon the bag 8.

For purposes of starting the tying operation, a trigger arm 84, pivotally mounted upon post 85, normally assumes a position illustrated in FIG. 13 by the action of a coil spring 86 mounted between pin 87 and pin hole 88 urging the arm 84 against the ledge 89. An L-shaped latch 90 having a tab 92 formed thereon normally engages the trigger arm 84, as illustrated in FIG. 13. The shaft 93 is fixedly mounted to latch 90 and extends downwardly through an elongated slot 94 formed in frame 10. The coil spring 96 constantly urges crankarm 95, latch 90, and arm 32, all of which are attached to shaft 93, in the counter-clockwise direction pivoting around bolt 97, illustrated in FIG. 14. The arm 32 includes a finger 32A, having a latch 32B formed thereon which engages the stop 28 on the rotatable clutch 26 thus preventing the transfer of motion through clutch 26 when the apparatus is in the position illustrated in FIG. 13.

Upon rotation of trigger arm 84 by the bag, the latch 90 is shifted upwardly and laterally toward the right from the position illustrated in FIG. 13. The arm 32 and crankarm 95 are pivoted clockwise around bolt 97 thus lifting finger 32A upwardly and allowing the clutch 26 to transfer power to the program plate 35 allowing it to rotate through one complete revolution.

As illustrated in FIGS. 13 and 14, a means for wrapping tie material a portion of a distance around the bag includes a U-shaped wrapping finger 98 pivotally mounted upon a bolt 99 which is within frame 10. The wrapping finger 98 has a guide formed at its extremity for retaining the tie material 16 while it is being doubled over to a U-shaped position. An outwardly shaped slot 102 is cut into the frame 10, receives the extremity of wrapping finger 98, and helps retain tie material 16 during the wrapping operation. The finger 98 is operated by rotation of a generally T-shaped member 104 and link 108. The member 104 is pivotally mounted upon frame 10 by a pin 106 passing therethrough and link 108 is pivotally attached to member 104 by pin 109 and also pivotally mounted on finger 98 by pin 110. The spring 111 engages T-shaped member 104 and is restrained by bracket 112 which is attached to frame 10 by bolt 112A. The normal position of the finger 98 is illustrated in FIG. 13 since spring 111 constantly urges member 104 in the counter-clockwise direction thereby tending to laterally shift link 108 generally to the right and pivot finger 98 counter-clockwise until the U-shaped surface 98A engages the gathered portion of bag 8. The arm 104A extends radially from the T-shaped member 104 and rides on the cam 52 during a portion of its rotation thereby causing the member 104 to be pivoted clockwise, dragging link 108, and pivoting wrapping finger 98 clockwise to the position illustrated in FIG. 13. Thus it will be appreciated that an arm 104A drops from cam 52, spring 111 will pivot member 104, drag link 108, and pivot wrapping finger 98 to its operative position.

The means for feeding tie material 16 includes feeding disc 90 and the idler 114. The feeding disc 40 has thereon a strip 40A fabricated from an elastomer, rubber or the like and is fixedly attached to a portion of the periphery. The idler 114 rotates about pin 114A that is mounted on the member 116. Thus it will be appreciated that strip 40A forces tie 16 against idler 114 thus pulling the tie 16 from the supply reel 14 during that portion of the rotation of program plate 35 during which strip 40A is proximate to idler 114. Therefore the circumference of string 40A is the increment of feed of tie 16 and this length is graphically illustrated in FIG. 13 which is the distance from point P to the surface of the shear plate 64.

Referring again to FIGS. 13 and 14, a means for preventing rotation of the shaft 60, shear blade 56, and twister head 54 includes the interengagement of plate 38 with the flat 78 formed on extension 76. As illustrated in FIG. 14, the shaft 60 and the associated components mounted thereon cannot rotate while the plate 38 is position below post 76 since step 78 prevents rotation thereof. The plate 38 extends only around a portion of the program plate and thus after sufficient rotation, the shaft 60 is free to rotate upon engagement of pinion 74 with segmented bevel gear 36. The disc 38 and post 76 keep the proper alignment of gear 74 and gear 36 to prevent clashing or locking upon engagement and also twister head 54 and shear blade 56 are kept in proper relation.

The twister head 54 only rotates during the engagement of segmented bevel gear 36 with pinion 74. It has been found in practice that approximately 1½ rotations of twister head 54 are all that are necessary to sufficiently twist tie 16 around a bag in order to retain it in place and prevent loss of the items within the bag.

The operation of the apparatus will now be described.

Referring to FIGS. 13 and 14, the rotor 18 is energized by a suitable power supply (not shown), hereby supplying rotative motion to output shaft 20, gear box 22, shaft 24, and clutch 26. In the position illustrated in FIG. 13, clutch 26 is disengaged thereby not allowing power to be transmitted to the output shaft 34.

The bag is filled with articles and the open top is gathered by hand to the point where the bag top may enter the V shaped groove 13 in frame 10. The operator may hold the bag by one hand adjacent the open top as he inserts it into groove 13, forcing it outwardly until trigger arm 84 is pivoted clockwise. This action rotates latch 90 slightly counter-clockwise and laterally toward the right against the tension of spring 96. Coincidentally, arm 32 is pivoted clockwise around pin 97 until the toe 32B lifts from the stop 28 of clutch 26. Power is then supplied through clutch 26 rotating the program plate 35 through one complete revolution which takes on an average of 2 seconds during which the following motions and steps occur.

It is presumed that tie material 16 has been drawn from reel 14, extending between strip 40A and idler 114, through the tube 64 and extending through opening 65 in shear plate 64. Rotation of program plate 35 from the position illustrated in FIG. 13, will pull tie 16 from reel 14 by the co-action of strip 40A on the feeding disc 40. The tie material 16 will then extend past twister head 54 substantially parallel to the axis of shaft 60 until it reaches point P which is the metered amount of feed during each revolution of the program plate 35.

Concurrently, the cam 52 is rotated to the point where arm 104A is no longer in engagement herewith and allows the T-shaped member 104 to pivot counter-clockwise around pin 106 caused by the tension of spring 111. The link 108 is shifted laterally to the right causing wrapping finger 98 to be pivoted counter-clockwise. The wrapping finger 98 is defined to force tie material 16 in its extended position around bag 8 until it is doubled over.

At this period of rotation of program plate 35, post 76 and flat 78 are no longer in engagement with segmented plate 38 and as the segmented gear 36 engages pinion 34, the entire assembly of pinion 74, shaft 60, blade 56, and twister head 54 will then rotate during the entire time that pinion 74 is in engagement with gear 36. The shear blade 57 will rotate counter-clockwise severing tie 16 and simultaneously twister head 54 will rotate to start twisting tie material 16. At the start of the twisting operation, the U shaped tie material passes on opposite sides of twister head 54. The rotation of head 54 causes the ties to enter the arcuately shaped slots 55A and 55B. Guide 81 with foot 82 forces the tie 16 against the back portion of twister head 54 for the purposes of tightly twisting the tie until it assumes a fully twisted position.

The twisting operation is then complete and the operator may remove the tied bag from groove 13. The arm 84 again assumes the position in FIG. 13, allowing latch 90 to return to its original position and return stop 32B abuts stop 28. The program plate 35 has made one complete revolution and has stopped in the position illustrated in FIG. 13 ready for subsequent actuation by a bag to be thrust against trigger arm 84 to again repeat the operation.

Now referring to FIG. 15, the specific provisions for preventing the unraveling of the tie material from its storage location during the intervals that the machine is inoperative and thereby always assures proper operation of the tying machine will be described. For the present, then, the operation of the tying head will be ignored and the structure and the operation of the braking mechanism will be described.

The tie material or tape is stored on a reel 14 mounted to the rear of the machine from the article tie end thereof. As illustrated, the tie material 16 is stored on the reel 14 which is comprised of a pair of spaced flanges similar to the illustrated flange 14A. The tie material is stored on the spindle 150 for the reel 14 as is conventional. The tie material then is unwrapped from the spindle 150 and passed through a tape guide 151 comprising an elongated, tubular spring mounted in a cantilever relationship with the machine frame as illustrated. The tie material is then passed from the tape guide 151 to the idler roller 114 adjacent the periphery thereof for supplying the tie cutting and twisting head proper.

The tape guide 151 is resiliently mounted in a cantilever fashion so as to have its free end movable in a vertical direction in response to the tension or pulling of the tie material 16 when the idler roller 114 functions to feed the tie material to the tying head proper. To this end, co-acting with the tape guide 151 is a braking mechanism functioning to normally brake the reel 14. An examination of FIG. 15 reveals that the reel 14 is mounted to the machine frame by means of a pair of supporting arms 152 mounted on the outside of the flanges 14A and secured to the spindle 150. The reel brake 153 is mounted to co-act with the movable tape guide 151 and to be responsive to the vertical movements of the guide 151 to place the brake 153 into engagement with the outer periphery of the flanges 14A when the machine is inoperative and to be moved out of engagement with the flanges 14A when the tape is placed under tension by means of the feed roller 114 to allow rotation of the reel 14. To this end, the brake 153 comprises a pair of resilient arms similar to arm 153A and having one end engaging the tape guide 151 intermediate its ends to be responsive to the movement of the free end of the guide 151 and has its opposite end constructed in a V-shaped configuration to engage the outer periphery of the flanges 14A. This latter mentioned end of the brake arm 153 is further identified by the reference character 153B. The arm 153 is resiliently mounted intermediate its ends by means of a tension spring 154 secured thereto and to the frame of the machine as illustrated.

It should now be appreciated that when the tie material 16 is fed by means of the interengagement of the idler roller 114 and the feeding portion 40A of the feeding disc 40 that the tie material will initially be placed under tension and thereby causes the free end of the tape guide 151 to move in a downward direction as illustrated in dotted outline, and thereby causes the portion 153A of the brake arm 153 to be moved in a downward direction as is also indicated in dotted outline to cause the opposite end or the end 153B to be moved away from the flange 14A and allow the reel 14 to rotate freely. Of course, when the feed portion 40A of the feeding disc 40 is no longer engaged, the tension on the tie material 16 will be released allowing the tape guide 151 and the brake arm 153 to assume its normal braking position in engagement with the flange 14A to prevent its continuous rotation and thereby prevent the unraveling of the tie material 16 from the reel 14.

With the above description in mind, the mechanism D for automatically feeding and positioning tags into the tying machine will now be described.

Figure 2:
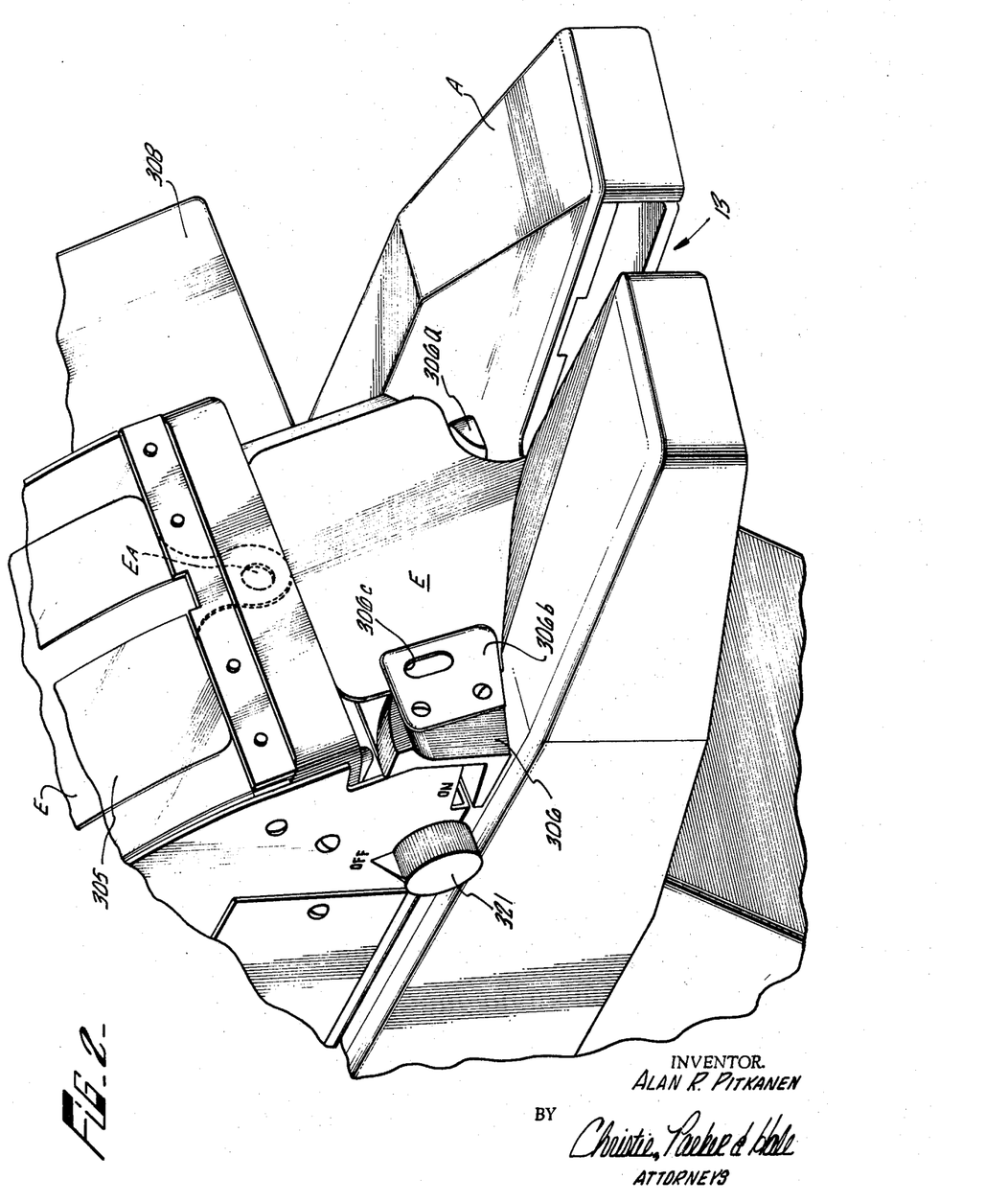
FIG. 2 is partial, front perspective view of the tagging and tying apparatus of FIG. 1 illustrating a tag held in the position to be tied to an article.
Figure 3:
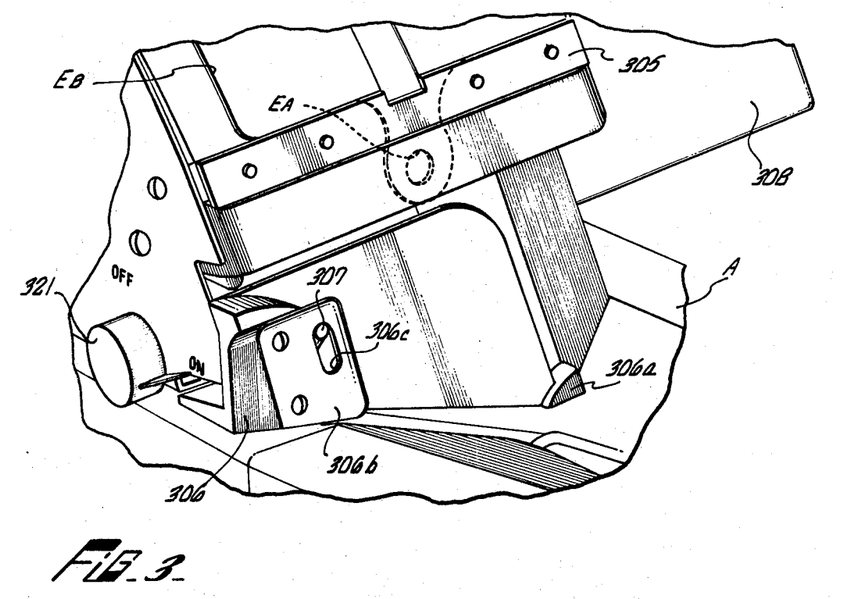
FIG. 3 is a partial, front perspective view of the tagging and tying apparatus similar to FIG. 2 with the tag to be tied withdrawn from the tag holder.
Figure 4:
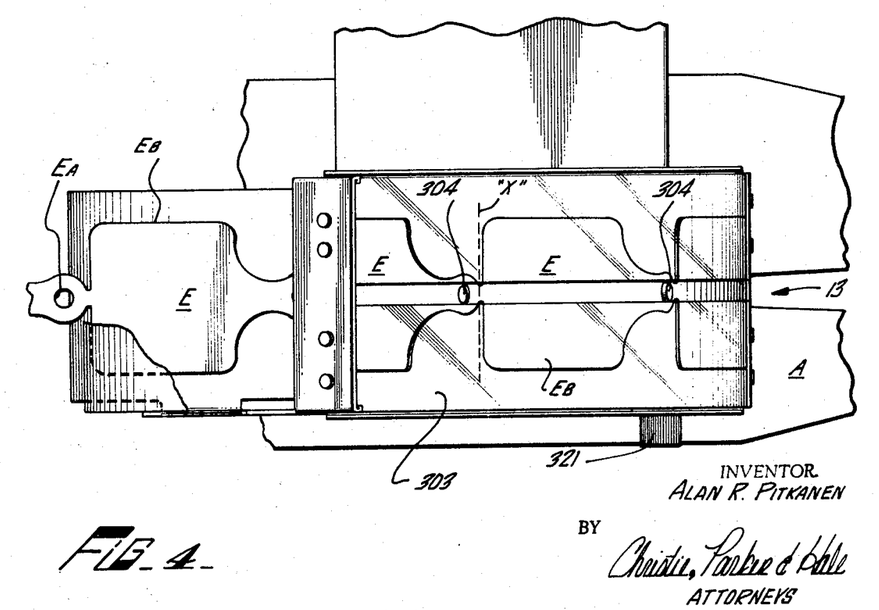
FIG. 4 is a partial, top plan view of the tagging and tying apparatus illustrating the relationship of the string of tags with the tag feed drum.

The tag-tying apparatus of the present invention is particularly adapted to tie an apertured tag to an article or a bag to be tied similar to the tag identified by the reference character E. The tag E, as illustrated in FIGS. 2–4 is of a generally T-shaped construction with an aperture $E_a$ defined adjacent the extremity of the upstanding portion $E_b$ of the tag.

The broad concept of the present invention is directed to the feeding of the tie material 16 along a predetermined path in the tying machine A in combination with the automatic means for feeding a tag E with the aperture $E_a$ arranged in the predetermined path to allow the tag E to be picked up by the tie material as it is fed through the twisting head 54. In this fashion, then, the tag E will be secured to the bag along with and during the tying operation for the tie material proper. Basically the tagging operation in the sense of the co-action between the tag and the tying machine A are the same as described in the aforementioned copending application. It will be recalled from the above description that a bag to be tagged and tied is moved into the throat 13 of the tying machine A to initiate the tying operation whereby a preselected length of tie material 16 will be fed along a predetermined path to thereby be threaded through the aperture $E_a$. As the tying operation continues, the tie material 16 now having the tag E secured thereto, is wrapped into a substantially U-shaped configuration about the open end of the bag. The two ends of the tie material 16 are then twisted and tied together and, in accordance with the operation of the above described tying apparatus, the secured end of the tie material is cut from its continuous length whereby the bag will be tagged and tied and may be withdrawn from the tagging and tying apparatus.

The tag positioning means D is arranged adjacent the inner extremity of the throat 13 for the tying apparatus A.

To accommodate the tag positioning means D and the tag end $E_b$ to allow for the insertion of the tag into the path of the tie material, the wrapping finger 98 is slightly modified adjacent its pivot point 99 by reducing the body thereof as illustrated in FIG. 13 and identified by the reference numeral 98A. Furthermore, to properly position the tag E, a pair of mounting plates 205 and 206 are secured to the frame adjacent the throat 13 and define the upper walls thereof. The plate 206 is further defined with an arcuate position 206A that is arranged adjacent the twisting head 54, as illustrated. The tag E then will be positioned adjacent the plate 206 with its backside resting thereagainst, whereby the center line of the aperture $E_a$ for the tag E is substantially coincident with the center line of the predetermined path of the tie material 16, to allow the tie material to pick up or be threaded through the aperture $E_a$ as it is fed through the twisting head 54. This relationship is most readily appreciated from an examination of FIG. 13.

Now referring to FIGS. 2 through 11, the detailed structure for the automatic tag positioning means for feeding the tag into the predetermined path for the tie material will now be described.

Figure 1:
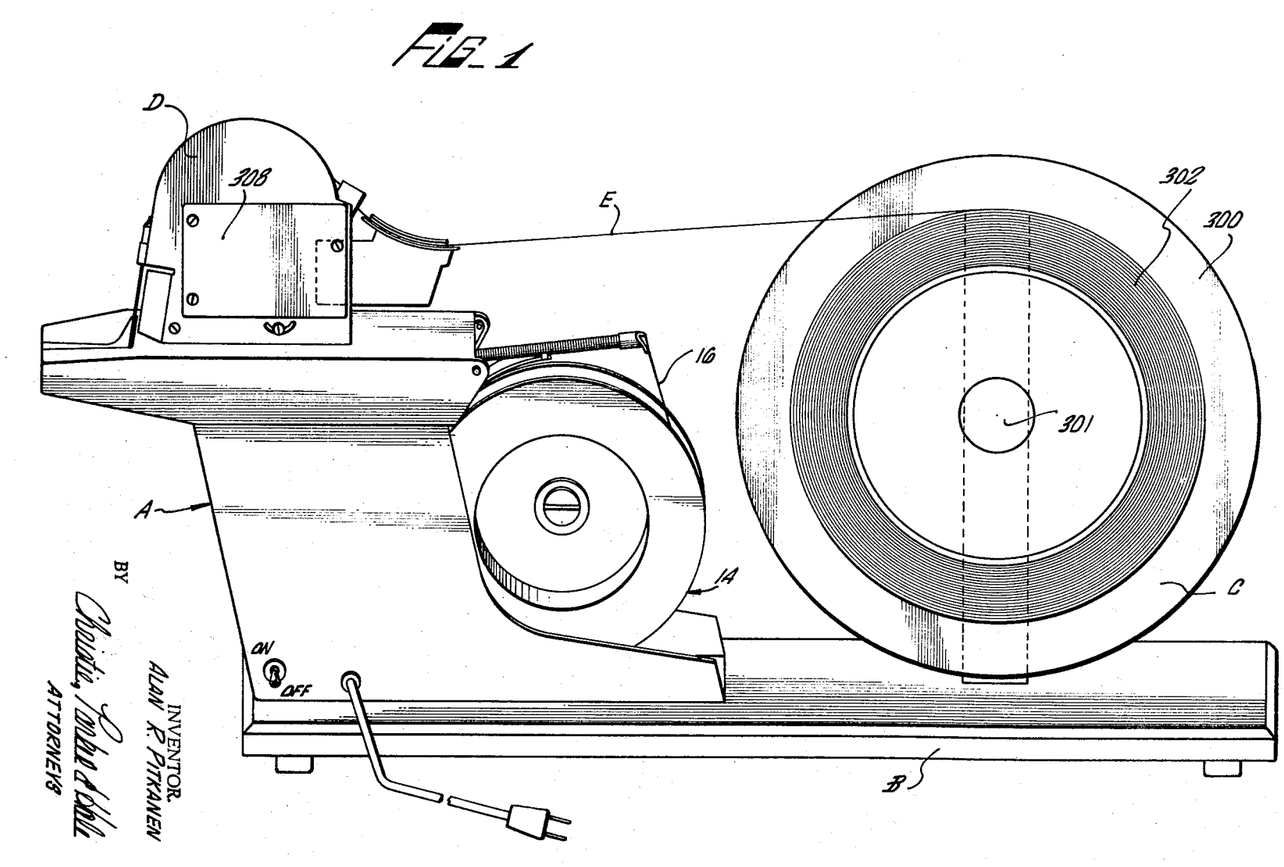
FIG. 1 is a side elevational view of the tying and tagging apparatus embodying the invention and taken along the line 1—1 of FIG. 5.

The tags E are stored on the tag supply reel C mounted on the base member B. The tag supply reel is defined by means of a plate 300 secured to the base B and constructed and defined with a hub 301 for mounting a roll of continuous tags E, such as the roll 302 shown mounted on the hub 301 in FIG. 1. The plate 300 is secured in an inclined relationship to the base member B in a non-rotatable fashion whereby the hub 301 loosely mounts the roll of tags 302 whereby the string of tags may be unrolled from the roll 302 by placing the tag string under tension. The plate 300 is illustrated inclined into the plane of the paper thereby eliminating the need for another plate on the opposite side of the roll 302. This construction eliminates any tendency for coasting of the tag string in that the movement of the roll 302 will be solely due to the tension applied to the free end of the tag string. The string of tags E are maintained in tension as a result of the construction and arrangement of the tag feed mechanism D, as will be evident immediately hereinafter. The tag feed mechanism D is mounted on the tying machine A in an inclined relationship with the machine A and in the same plane as the plate 300; see FIG. 5.

The tag feed mechanism D comprises an indexable drum 303 that is controlled for feeding the tags E into the predetermined path of the tie material 16. For this purpose the indexable drum 303 is provided with drive pins 304 mounted in a spaced-apart relationship about the outer periphery of the drum 303 to accept the tags E at the tag aperture $E_a$ thereby coupling the string of the tags E to the drive pins 304 in a driving relationship, as best seen in FIG. 4. This structure will then be seen to positively position the tags E to be tied in accordance with the positive indexing of the drum 303. The tag feed mechanism D further includes a tag guide 305 mounted to receive the string of tags E from the roll of tags 302 and is superimposed over the upper surface of the drum 303 to channel and hold the tags E in their driven relationship with the drive pins 304 on the drum 303. The indexing of the drum 303 then moves the tags E around the periphery of the drum and into the throat 13 for the basic tying apparatus A to be picked up by the tie material 16. With the positioning of the tag E in the throat 13, the tag will be located in the preselected path for the tie material 16 so as to cause the tie material to be threaded through the tag aperture $E_a$. As will be more evident hereinafter, the tag E is held in this position in a severed condition from the string of tags so as to be released from the tying apparatus A along with the tied article upon the completion of the tying operation.

The means for holding the tag E is defined adjacent the inner extremity of the throat 13 for releasably holding the tag E. For this purpose the holding means 306 includes a holding lip 306a for holding the edge of the tag E, as best illustrated in FIG. 2. The opposite side of the tag E or the edge illustrated on the left-hand side of FIG. 2 defining the upstanding portion of $E_b$ is releasably held by the holding member 306b. The holding member 306b is secured to the holder 306 proper in a spaced relationship along one edge thereof for defining a tag slot to allow the tag E to be positioned between the holding member 306b and the holder 306 proper. The tag E is held in this position once the leading edge thereof engages the inner end of the machine throat 13 during the travel thereof. This structure correctly positions and holds a tag E for the tagging and tying operation. In addition, this structure allows the tag to be withdrawn upon the completion of the tagging and tying operation.

The member 306b is further provided with an elongated aperture 306c that allows a switch actuator 307 to protrude therethrough for automatically signaling the presence or absence of a tag E in the holding means 306.

The relationship of the member 306b and switch actuator 307 is best illustrated in FIG. 3.

The tags E are positioned in the holding means 306 through the operation of the indexable drum 303. The drum 303 is indexed through the operation of a gear motor 308, of a commercially available, standard construction. The gear motor 308 drives the indexable drum 303 by means of a timing cam 309. The timing cam 309 is coupled to the drive shaft 308a for the gear motor 308 to be driven therewith. A single revolution of the gear motor 308 is effective for rotating and indexing the drum 303 for one-fifth of a revolution of the drum. Stated differently, with each one-fifth of a revolution of the drum 303 another tag E is fed into the holding means 306 in a position to be tied to an article. A complete rotation of the timing cam 309 is effective for indexing the drum 303 and for this purpose actuates the detenting roller 310 that indexes the drum by means of the drum indexing apertures 311. The operation of the timing cam 309 is such that it causes the detenting roller 310 to disengage from the drum aperture 311 immediately before the drive pin 312 thereof is positioned in driving relationship with the Geneva wheel 313 mounted concentric and integral with the drum 303; see FIG. 6. In addition the timing cam 309 is effective for operating the tag cutter 314 by operating the cutter actuating arm 315. The operation of the cutter 314 is effective for severing the tag E from the string of tags.

Figure 7:
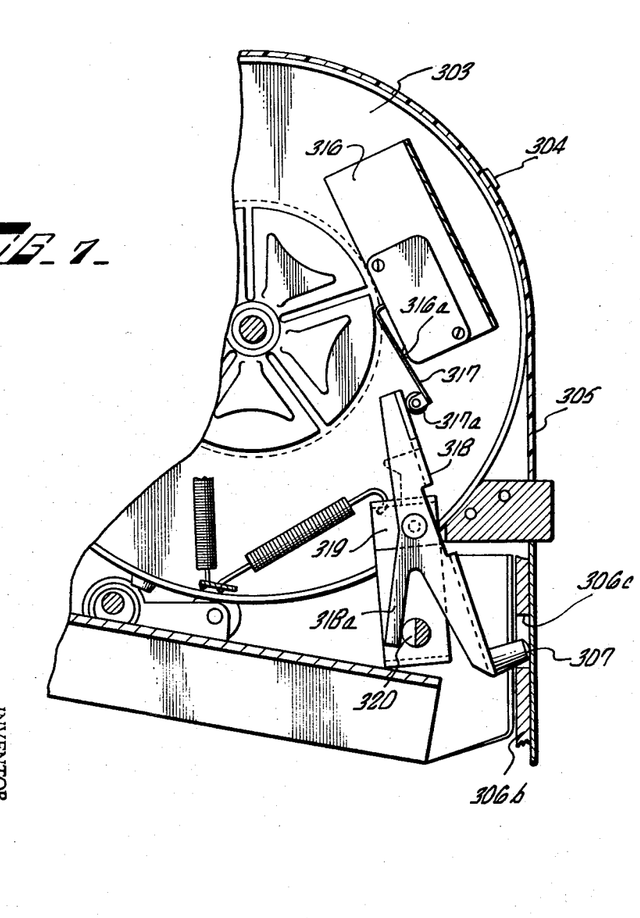
FIG. 7 is a partial, sectional view of the tag feed mechanism taken along the line 7—7 of FIG. 9 and illustrating mechanism in its "off" position.

The operation or energization of the gear motor 308 is controlled through the switch 316 connected thereto (not shown) and mounted on the opposite side of the drum 303 from the Geneva wheel 313; see FIG. 7. With each actuation of the switch 316 the gear motor 308 is energized and allowed to rotate a complete revolution. The switch 316 is arranged to be in a normally open circuit condition to maintain the gear motor 318 de-energized. This normal open circuit position of the switch 316 is best illustrated in FIG. 7. The switch 316 is operated by means of the switch actuating arm 317 coupled thereto for operating the switch actuating button 316a arranged to be engaged by the switch operating arm 317. It will be noted in an examination of FIG. 7 that the arm 317 engages and holds the switch operating button 316a inwardly and thereby maintains it in an open circuit condition. This open circuit condition is controlled through the swtch actuating arm 318 having one end engaging the roller 317a for the switch operating arm 317 and which arm has its opposite end mounting the switch actuator 307 arranged to move into and out of the aperture 306c of the holding means 306. For this purpose the switch actuator 318 is pivoted intermediate its ends to a follower element 319 operated by the timing cam 309.

Figure 8:
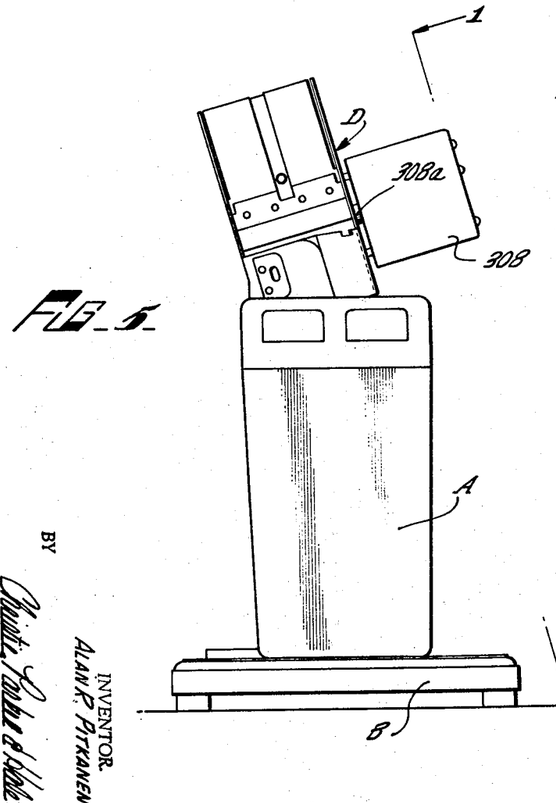
FIG. 8 is a partial, elevational view of the switch operating mechanism of FIG. 7 and shown in its "on" position.
Figure 9:
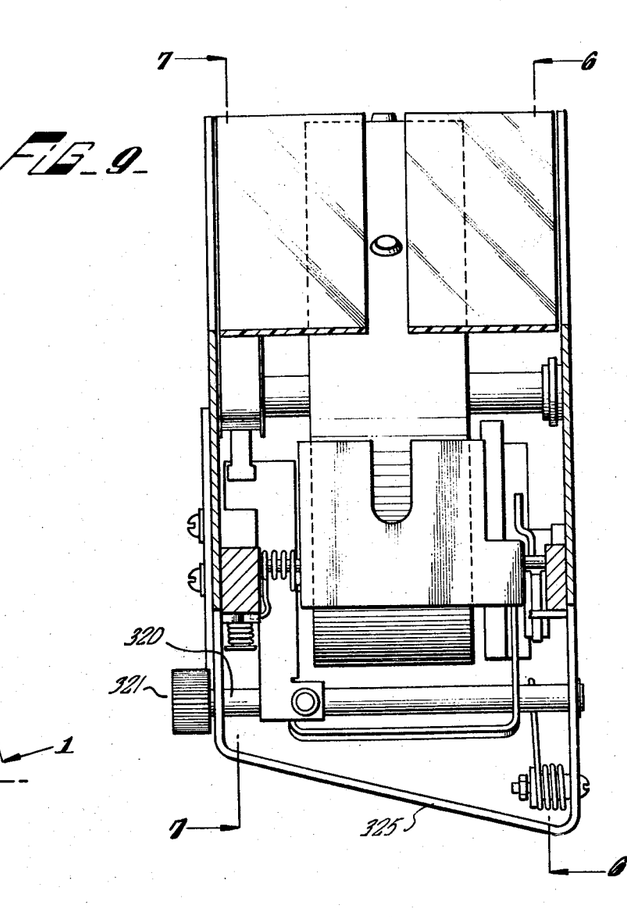
FIG. 9 is a top, plan view of the tag feed mechanism, with portions broken away.
Figure 10:
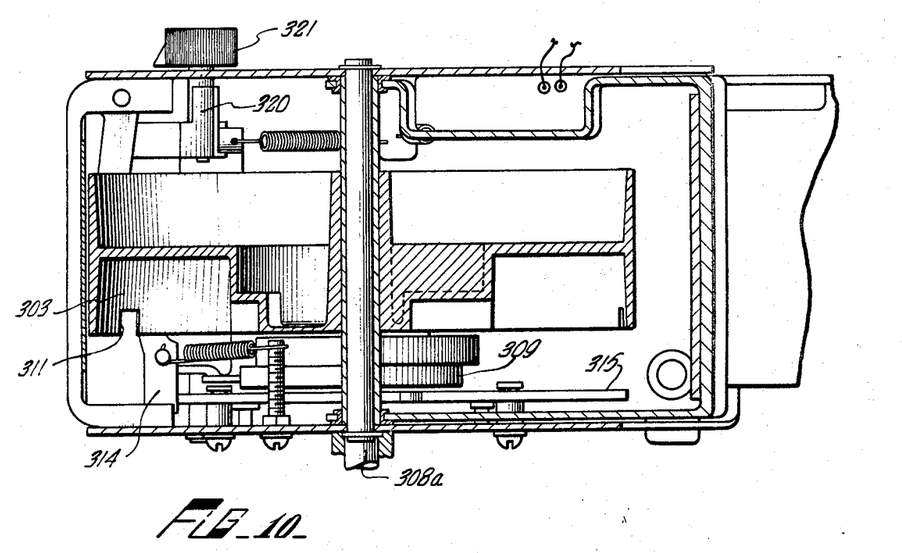
FIG. 10 is a sectional view of the tag feed mechanism taken along the line 10—10 of FIG. 6.
Figure 11:
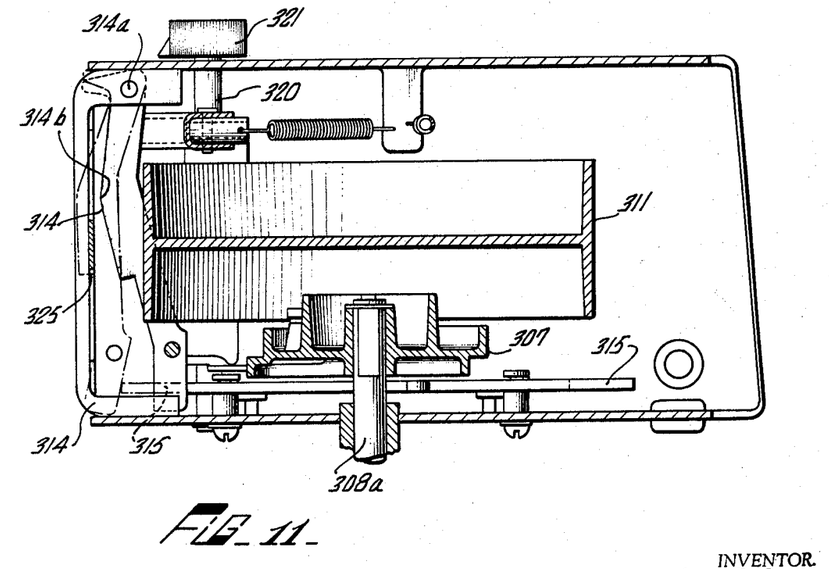
FIG. 11 is a sectional view, with portions shown in dotted line, of the tag feed mechanism taken along the line 11—11 of FIG. 6.
Figure 12:
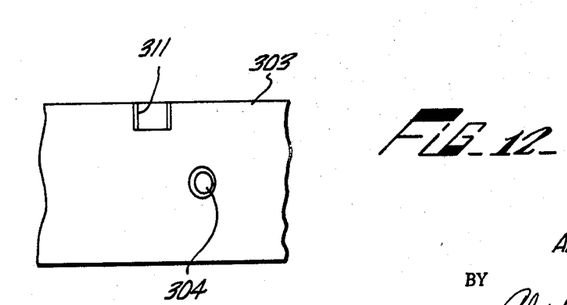
FIG. 12 is a partial, plan view of the indexable tag feed drum.

The switch actuator 318 and thereby the switch 316 is also controlled by means of the manually operated control shaft 320. The control shaft 320 mounts a control knob 321 on one end thereof to allow the shaft to be manually positioned. The control knob 321 is illustrated in its "off" position in FIG. 2. The switch actuator 318 is defined with a control portion 318a for engaging the adjacent portion of the control shaft 320. The relationship of the control portion 318a and the control shaft 320 in the "off" position is such that the control arm 318 maintains the switch actuator 317 in engagement with the button 316a. The control shaft 320 is further provided with a cutout portion, essentially U-shaped in cross-section, to accommodate the control portion 318a and allow the switch control portion 318a to move outwardly from the position illustrated in FIG. 7 to the position illustrated in FIG. 8 when the control knob 321 is moved to the "on" position. This will cause the switch actuator 318 to rotate about its pivot point in a counter-clockwise direction and cause the switch actuating arm 317 to move away from the outer end of the switch actuating button 316a for placing the control switch 316 in a closed circuit condition to thereby energize the gear motor 308. As will be noted from examining FIG. 8 closely the switch actuating arm 318 has its operating button 307 extending through the aperture 306c for the holding arm 306b in a position to intercept a tag E moved therepast. This is to be contrasted with the withdrawn position of the button 307, as illustrated in FIG. 7. The control shaft 320 is illustrated in FIGS. 7 and 8 in the position corresponding to the "on" position of the control knob 321. It should now be evident that with the absence of the tag E in the holding means 306, that the switch 316 will be in a closed circuit condition for energizing the gear motor 308 when the control knob 321 is rotated to its "on" position or rotated approximately ninety degrees. When these operating conditions prevail, however, and a tag E is being moved into position in the holder 306, the button 307 is in a retracted position as a result of the co-action of follower 319 and the timing cam 309. After the tag E is moved into its final position, the button 307 moves forwardly in accordance with the continued co-action of the follower arm 319 and the timing cam 309. At this time, the button 307 has its forward travel prevented by the presence of tag E to thereby cause the switch actuating arm 318 to operate the switch 316 to an open circuit position or to assume a position corresponding to the "off" position shown in FIG. 7.

With the above described construction in mind, it should now be clear that with the withdrawal of a tag E from the tying machine A that the switch 316 is operated to actuate the gear motor 308 for driving the drum 303 to position another tag E into the holding means 306. This tag feeding action occurs when the control knob 321 is rotated to the "on" position. Also, with the presence of a tag E in the holder 306, the switch 316 is maintained in an open circuit condition whereby the gear motor 308 is maintained deenergized during the period that the tying machine A is effecting the tagging and tying operation. As it will become more evident hereinafter, once the gear motor 308 is energized it will be maintained energized a sufficient time interval to allow a tag feed cycle to be completed. For this purpose the follower arm 319 is operated by the timing cam 309 to move the switch actuating arm 318 therewith to a position away from the switch operating arm 317 to prevent the operation of switch 316 to an open circuit condition until the timing cam has made a complete cycle. It should be recognized that without the interruption of a complete cycle of the gear motor 308 that the indexing of the drum 303 for the desired increment will be provided to insure that a tag E is always fed into the holder 306 with each revolution of the gear motor.

Another feature of the present invention is that the tags E may be selectively fed into the tying machine A through the operation of the control knob 321. It will be recalled that the basic tying apparatus A functions independently of the tag feeding mechanism D and therefore as the control knob 321 is rotated to the "off" position it will merely cause the tag feed mechanism D to be rendered inoperative whereby an article may still be tied through the operation of the basic tying mechanism A. This will allow the tagging and tying machine to be selectively used for articles that need to be tied and tagged and for those articles that need only to be tied.

Figure 6:
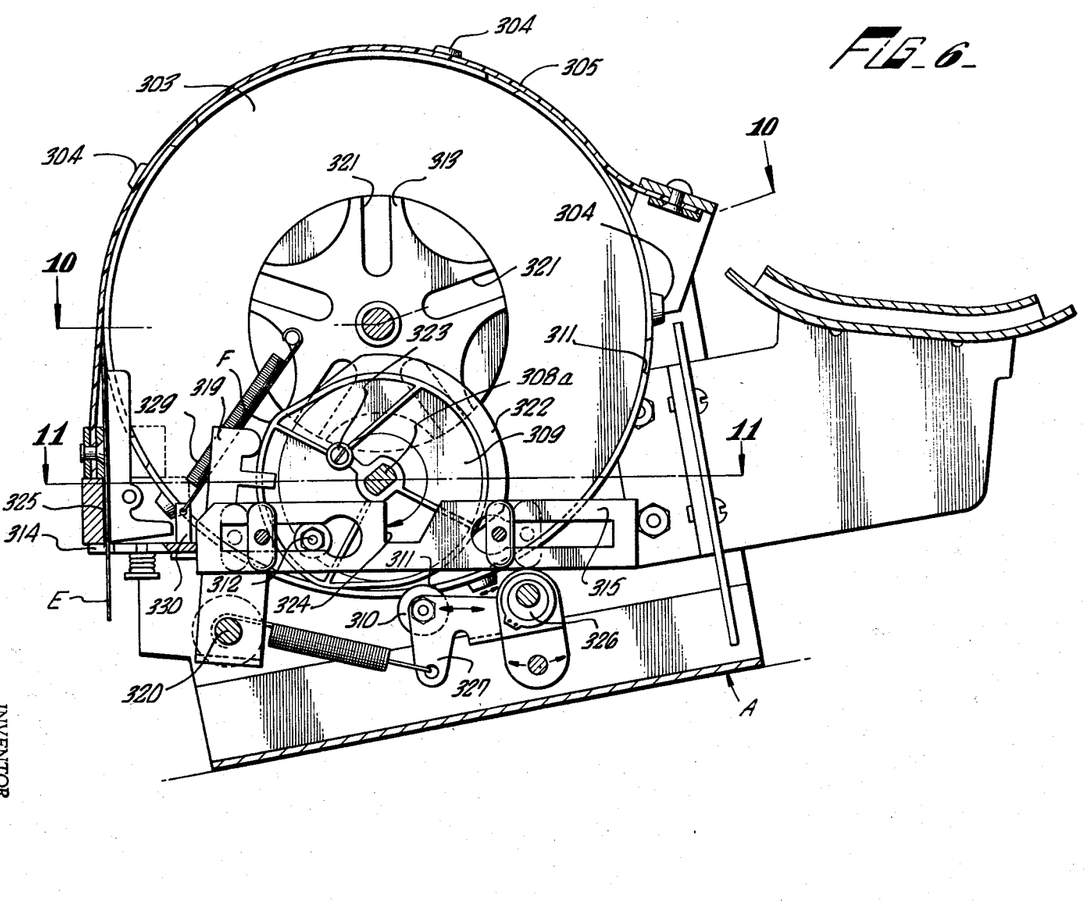
FIG. 6 is a sectional view of the tag feeding mechanism of the apparatus taken along the line 6—6 of FIG. 9 and illustrating the mechanism in its "off" position.

The indexing structure for the drum 303 can now be examined in more detail. The drum 303 is provided with a Geneva wheel 313 that is constructed integral and coaxial therewith as best illustrated in FIG. 6. The Geneva wheel 313 is provided with five drive sockets 321 spaced about the wheel in the usual fashion for driven co-action with the timing cam 309 and spaced apart to index the drum one-fifth of a revolution with each revolution of the timing cam 309. The positive driving of the drum by means of the Geneva wheel 313 is more or less conventional and consists of rotating the timing cam 309 to cause the drive pin 312 mounted thereon to extend into one of drive sockets 321. This occurs when the timing cam 309 is rotated a complete cycle from its normally "off" position, as illustrated in FIG. 6. As mentioned hereinbefore, the drum 303 further includes the indexing aperture 311 for co-action with the detenting rollers 310 for positively indexing the drum. To this end the timing cam 309 is provided with a detenting portion 322 that is rotated to engage the roller 310 and force it out of the detenting aperature 311 to allow the drum to be rotated. The construction and definition of the cam portion 322 is such that upon rotation of the timing cam 309 it releases the drum immediately before the drive pin 312 enters a drive socket 321. In addition, the detenting roller 310 is maintained out of indexing position during the rotation of the drum 303 until the next successive indexing aperture 311 is positioned to accept the roller 310 and positively index the drum. During the rotation of the timing cam 309 the follower element 319, which is shown in FIG. 6, as engaging the outer periphery of the timing cam 309, follows the contour of the timing cam 309 along the surface F. In following the surface F the element 319 will fall towards the center of the drive shaft 303a to cause the pivot for the switch actuator 318 to be moved to the left from the position illustrated in FIG. 7 and to maintain it in this position for the desired interval to positively index the drum and to thereby prevent the closing of the switch 316 during the indexing of the drum to positively insure that a tag is correctly positioned.

The timing cam 309 is also effective in operating the cutter 314 during the indexing of the drum. For this purpose the cam 309 is provided with an operating arm or stub shaft 323 connected for rotation with the rotation of the cam 309 in a clockwise direction. When the arm 323 is rotated to engage the cutter actuating lever 315 at the drive socket 324 it will drive the actuating lever 315 therewith to cause the lever to move from its normal position to a position to the left, as illustrated in FIG. 6. The movement of the lever 315 to the left is effective for actuating the cutter 314 to sever a tag E from a string of tags. The cutter 314 operates in a scissors-like fashion by being moved over the co-acting portion of a stationary cutter 325; see FIG. 11. The cutter 314 is contiguous to the actuating lever 315 to be movable therewith and for this purpose they rub against each other in operation. The opposite end of the cutter 314 is connected to the pivot pin 314a to thereby cause the cutter to move over the stationary cutter 325 in response to the operation of the operating lever 315.

The cutter 314 is defined with a protruding portion 314b for cutting co-action with the stationary cutter 325. The protruding portion 314b and the corresponding portion of the stationary cutter 325 are sharpened to effect the desired cutting of a tag. A close examination of FIG. 11 will reveal the scissors-like action of the cutters 314 and 325 wherein the extreme outer position of the cutter 314 is illustrated in dotted outline. The operation of the cutter 314 cause a tag E to be severed along a line X, as illustrated in FIG. 4. A spring 329 is mounted to the cutter 314 by means of the upstanding arm 330 and having its opposite end secured to the Geneva wheel 314 to retract the cutter 314 once it is actuated.

The location of the line X or the severance line for the tag E can be adjusted manually through the adjustment of the shaft 326 which mounts the arm 327 in turn mounting the detenting roller 310. The movement of the shaft 326 will be effective to cause the drum drive pin 304 to be moved relative to the cutter 314 to thereby redefine the cutting line X or the position that the tag is being cut. This is possible due to the tolerances in the mechanism.

In summary then, the operation of the tagging and tying apparatus can now be reviewed. Initially it will be assumed that the control knob 321 is turned to the "off" position whereby the tag feeding apparatus D is rendered inoperative. It will also be assumed that the on-off button (see FIG. 1) for the tying apparatus A has been moved to the "on" position for energizing the tying machine. It should now be appreciated that an article to be merely tied may now be placed into throat 13 of the tying apparatus A and upon being moved into engagement with the arm 84, the tying operation is initiated. Accordingly, the tie material 16 will be fed along its predetermined path adjacent the tying and twisting head 54 to cause the material to be positioned around the article to be tied, twisted and simultaneously severed from the continuous length of tying material.

If the next article to be tied is required to be tagged, the control knob 321 must be turned to the "on" position. Initially, it will be assumed that the control knob 321 was placed in the "off" position before the completion of a tagging and tying operation whereby the holder 306 does not retain a tag E at the time that the control knob 321 is placed in the "on" position. Accordingly the rotation of the knob 321 will immediately cause the tag E held on the drum 303 immediately above the holder 306 to be indexed and positioned into the holder 306 in preparation for the tagging and tying operation. It should now be appreciated that the rotation of the control knob 321 will cause the switch actuating button 307 to attempt to protrude through the holder aperture 306c for operating the switch 316 to effect the desired feed of a tag E into position. After the tag E is in position in the holder 306, the button 307 will be prevented from moving through the aperture 306c and will assume the position inwardly of the aperture 306c, (see FIG. 7) for operating the switch 316 to an open circuit condition and thereby de-energize the gear motor 308 and arrest the indexing of the drum 303. The article to be tied and tagged may now be placed into the throat 13 of the tying apparatus A. Upon the article engaging and actuating the trigger arm 84, the tie material 16 will be threaded through the aperture $E_a$ of the tag E being held by the holding means 306 and wrapped in a U-shaped fashion around the article. Also with the actuation of the twisting head 54, the tie material is twisted into a tie and the end severed from the continuous strip of tie material. With the completion of the twisting and tying operation, the tying apparatus A de-energizes itself and the tagged and the tied article may then be withdrawn from the machine and the operation will have been completed.

With the withdrawal of the tagged and tied article from the machine, the button 307 will again be forced out of the aperture 306c and cause the switch 316 to be operated to a closed circuit condition for energizing the gear motor 308. The energization of the gear motor 308 will rotate the shaft 308a and the timing gear 309 through a complete revolution. During this revolution the drum 303 is indexed one-fifth of a revolution by means of the drive pin 312 engaging the drive socket 321 for the Geneva wheel 313. At this time the detent roller 310 will be withdrawn from the indexing aperture 311 on the drum 303 and during this same interval the drive arm 323 will engage and operate the cutter actuating lever 315. Accordingly the cutter 314 will be forced forwardly into the path of the tag E and sever the tag from the continuous strip of tags in a scissors-like fashion. Upon completion of the complete cycle of the timing cam 309 the drum will have been indexed to a position whereby the detent roller 310 will be placed into the next successive detenting aperture 311 for positively holding the drum in position. At this same time the cutter 314 will have been retracted out of the path of the tag E by means of the return spring 329.

It will also now be appreciated that during the feed cycle of the tag E that the follower arm 319 riding along the surface F of the cam 309 will maintain the switch 316 in a closed circuit condition for the entire revolution of the cam to assure that a tag E is fed into the tagging position once the cycle is initiated.

What is claimed is:

1. Apparatus for tagging and tying articles with tie material capable of being twisted to form a tie comprising:
   means for automatically twisting and tying a preselected length of tie material around an article to be tied,
   means for automatically positioning a tag adjacent the twisting and tying means to be carried by the tie material and tied to the article therewith, and
   means coupled to said automatic means and responsive to a completed tagging and tying operation for actuating said automatic means.

2. Apparatus for tagging and tying articles comprising:
   means for advancing a preselected length of the material to be tied along a predetermined path,
   means for advancing an apertured tag along the predetermined path to be secured to the advancing tie material by threading the advancing tie material therethrough, and
   means for twisting and tying the preselected length of tie material carrying the threaded tag around an article to be tied to thereby secure the tag to the article to be tied,
   said tag advancing means being coupled to said twisting and tying means for automatically advancing a tag in response to the completed operation of the twisting and tying means.

3. Apparatus for tagging and tying articles as defined in claim 2 wherein said advancing means comprises positive indexing means for positively positioning a tag into the predetermined path, and including tag storage means for advancing a string of tags and tag cutting means for cutting the tag positioned into the predetermined path during the operation of the tag advancing means.

4. In tying apparatus wherein tie material capable of being tied by twisting is advanced around an article to be tied and automatically tied thereto, the improvement of which comprises:
   means for automatically feeding tags in the path of the advancing tie material to be carried by the tie material and secured to the article upon twisting the tie material to the article to thereby tie and tag the article.

5. In tying apparatus as defined in claim 4 including:
   means for selectively operating said automatic tag feeding means without effecting the automatic tying apparatus whereby an article may be selectively tied and tagged or tied without tagging.

6. Apparatus for tagging and tying articles comprising:
   a rotatable cutting and twisting head,
   means for storing a continuous length of tie material capable of being tied by twisting,
   means for feeding a preselected length of tie material adjacent said head to be operated on by said head,
   means for storing a continuous length of tags to be mounted to the tie material,
   automatic means for feeding a tag adjacent said head from the storage means and severing the tag from the continuous length of tags,
   and drive means connected to said tie material feeding means and said twisting head for operating same to cause the preselected length of tie material mounting the tag to be severed from its continuous length and to be simultaneously twisted about an article during the rotation of said head.

7. Apparatus for tagging and tying articles with tie material capable of being twisted to form a tie comprising a rotatable twisting head, means for automatically positioning tags adjacent said twisting head to be carried by the tie material, means for positioning a preselected length of tie material in an essentially U-shaped configuration about an article to be tied and to be operated on by said head, drive means connected for operating said positioning means and for rotating said head for a preselected interval to cause the twisting element to engage the portions of the tie material defining the arms of the U-shaped material for twisting and tying them to the article being tied, and means constructed and defined for movement in the path of the article to be tied to the twisting head and to be moved by the article and coupled to said drive means for actuating same in response to said movement, said tag positioning means being further characterized as releasably holding the tag to allow the tied and tagged article to be withdrawn from said actuating means and thereby from the apparatus and including means responsive to the withdrawal of the tag from the apparatus for actuating the automatic positioning means.

8. Tying apparatus comprising rotatable means for storing and supplying a continuous length of tie material, a rotatable cutting and twisting head for receiving the tie material and twisting it on itself and cutting it from the continuous length supplied, a movable wrapping finger mounted adjacent said head to receive the tie material and to wrap it around an article to be tied and to be received by said head for twisting and cutting, means for receiving the tie material from said storing means and feeding a preselected length of tie material adjacent said wrapping finger, tag feeding means for temporarily holding a tag and automatically positioning a tag into the feed path of the tie material to be carried thereby, trigger means mounted to intercept an article to be tied when positioning the article adjacent said head and to be movable therewith, drive means connected to be responsive to the movement of the trigger means towards said head to be actuated thereby for a preselected interval, programming means coupled to said drive means and connected to said tie material feeding means, wrapping finger and cutting and twisting head for operating same in a preselected sequence whereby a portion of tie material carrying the tag is first fed by said head and is partially wrapped around the article to be tied by the wrapping finger and to be simultaneously twisted around the article and cut from the length of the material by said head thereafter allowing the tied and tagged article to be withdrawn from the apparatus, and braking means normally engaging said storing means for preventing the supplying of tie material except during the feeding intervals determined by said programming means, said tag feeding means including means responsive to the withdrawal of a tag from the temporary holding means for actuating same to automatically position another tag in the holding means in preparation for the subsequent tagging and tying operation.

9. Tying apparatus as defined in claim 8 wherein said tag feeding means comprises a rotatable tag supply reel for storing a continuous string of tags, the supply reel being arranged to allow the string of tags to be extended from the reel to be positioned into the temporary holding means, said tag feeding means including means for simultaneously severing a tag from the string of tags thereby holding the severed tag in the holding means in preparation for the next tying operation.

10. Tying apparatus as defined in claim 9 wherein the string of tags comprises a string of apertured tags and which tags are carried by the tie material by causing the preselected length of tie material to be threaded through the tag apertures while positioned in the holding means.

11. Tying apparatus as defined in claim 10 wherein said means responsive to the withdrawal of a tag from the holding means includes an indexable tag feeding drum having a plurality of feed pins spaced thereon to receive the string of tags from the tag supply reel and mount the tags by means of the feed pins at the tag apertures for feeding the tags into the holding means, and including means for positively indexing the drum in response to each withdrawal of a tag.

12. Tying apparatus as defined in claim 11 wherein said indexable drum mounts a Geneva-type indexing wheel and said indexing means includes a timing-indexing cam for coaction with said Geneva wheel for driving said drum a preselected increment to feed a tag, said indexing means including detenting means mounted to be responsive to said cam for momentarily releasing the drum to allow the cam to drive the drum the preselected increment.

13. Tying apparatus as defined in claim 12 including switching means connected to be responsive to the withdrawal of a tag from the positioning means for actuating the indexing means and including means for assuring actuation of the indexing means for the entire preselected increment to correctly position a tag.

14. Tying apparatus as defined in claim 13 wherein said cam is constructed and defined for actuating the tag severing means during the indexing of the drum.

15. Tying apparatus as defined in claim 8 wherein said tag feeding means includes means for selectively controlling the operation of said tag feeding means independently of the cutting and twisting head whereby an article may be selectively tied and tagged or tied without a tag.

References Cited

UNITED STATES PATENTS

| | | | |
|---|---|---|---|
| 2,267,532 | 12/1941 | Moberg | 53—135 |
| 2,711,278 | 6/1955 | Gray | 140—93.6 |
| 3,221,468 | 12/1965 | Casey | 53—135 |

RICHARD J. HERBST, *Primary Examiner.*

L. A. LARSON, *Assistant Examiner.*